(12) United States Patent  
Kent et al.

(10) Patent No.: US 9,135,349 B2
(45) Date of Patent: Sep. 15, 2015

(54) AUTOMATIC TECHNICAL LANGUAGE EXTENSION ENGINE

(75) Inventors: Paul R. Kent, Edmonds, WA (US); John D. Hays, Edmonds, WA (US); Mark J. Trumper, Edmonds, WA (US)

(73) Assignee: MAVERICK MULTIMEDIA, INC., Edmonds, WA (US)

( * ) Notice: Subject to any disclaimer, the term of this patent is extended or adjusted under 35 U.S.C. 154(b) by 1041 days.

(21) Appl. No.: 13/005,446

(22) Filed: Jan. 12, 2011

(65) Prior Publication Data

US 2011/0172987 A1    Jul. 14, 2011

Related U.S. Application Data

(60) Provisional application No. 61/294,364, filed on Jan. 12, 2010.

(51) Int. Cl.
  *G06F 17/28* (2006.01)
  *G06F 17/30* (2006.01)
  *G06F 17/24* (2006.01)

(52) U.S. Cl.
  CPC ........ *G06F 17/30867* (2013.01); *G06F 17/241* (2013.01); *G06F 17/289* (2013.01)

(58) Field of Classification Search
  USPC ...................................... 704/2–10
  See application file for complete search history.

(56) References Cited

U.S. PATENT DOCUMENTS

| 5,873,055 A * | 2/1999 | Okunishi | 704/2 |
|---|---|---|---|
| 8,209,164 B2 * | 6/2012 | Etzioni et al. | 704/2 |
| 2002/0123878 A1 * | 9/2002 | Menke | 704/2 |
| 2003/0154069 A1 | 8/2003 | Carew et al. | |
| 2004/0167784 A1 * | 8/2004 | Travieso et al. | 704/270.1 |
| 2004/0168132 A1 * | 8/2004 | Travieso et al. | 715/536 |
| 2004/0237044 A1 * | 11/2004 | Travieso et al. | 715/530 |
| 2008/0319744 A1 * | 12/2008 | Goldberg | 704/235 |
| 2009/0125497 A1 * | 5/2009 | Jiang et al. | 707/4 |
| 2009/0281790 A1 * | 11/2009 | Travieso et al. | 704/8 |
| 2010/0030550 A1 * | 2/2010 | Travieso et al. | 704/7 |
| 2010/0169764 A1 * | 7/2010 | Travieso et al. | 715/239 |
| 2010/0299150 A1 * | 11/2010 | Fein et al. | 704/277 |

FOREIGN PATENT DOCUMENTS

| KR | 10-0686715 B1 | 2/2007 |
|---|---|---|
| KR | 10-2007-0117554 A | 12/2007 |

* cited by examiner

*Primary Examiner* — Leonard Saint Cyr
(74) *Attorney, Agent, or Firm* — Olympic Patent Works PLLC

(57) ABSTRACT

Certain embodiments of the present invention are directed to methods and systems for facilitating comprehension of web pages by non-native speakers of the base language in which the web-page content is provided. In these embodiments, selected base-language terms of a web page are automatically linked with translations of the terms, into one or more target languages, that are stored in a computer-readable database. A web-page-reader's browser is enhanced by the system to provide translations of displayed terms from the base language to the reader's native language or another target language selected by web-page reader. In alternative embodiments of the present invention, selective term translation is provided to users of various additional types of information display systems, including electronic-book displays, mobile phones, and other information-display devices.

20 Claims, 12 Drawing Sheets

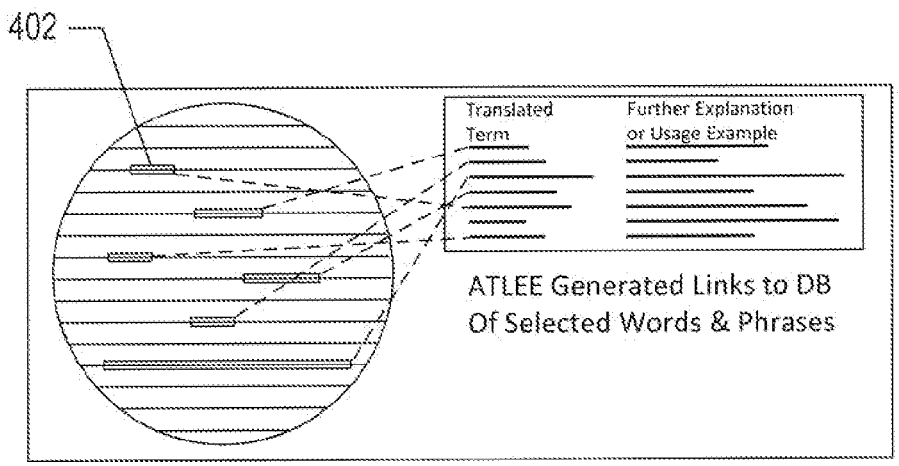

FIG. 4

1. Term and Rent. Month to Month Lease: Lessor leases the demised premises to Lessee for a term of one half month (15 days), commencing February 14, 2009, and terminating on February 28, 2009, at the rental rate of one thousand one hundred and seventy-five dollars ($1,175.00), that rate being the prorated monthly rental for one half month. This lease will automatically renew each calendar month...

FIG. 5

1. Term and Rent. Month to Month Lease: Lessor leases the demised premises to Lessee for a term of one half month (15 days), commencing February 14, 2009, and terminating on February 28, 2009, at the rental rate of one thousand one hundred and seventy-five dollars ($1,175.00), that rate being the prorated monthly rental for one half month. This lease will automatically renew each calendar month...

FIG. 6

1. Term and Rent. N locataire *(à bail)* ease: Lessor leases the demised premises to Lessee for a term of one half month (15 days), commencing February 14, 2009, and terminating on February 28, 2009, at the rental rate of one thousand one hundred and seventy-five dollars ($1,175.00), that rate being the prorated monthly rental for one half month. This lease will automatically renew each calendar month...

FIG. 7

1. Term and Rent. N 契約者へ ease: Lessor leases the demised premises to Lessee for a term of one half month (15 days), commencing February 14, 2009, and terminating on February 28, 2009, at the rental rate of one thousand one hundred and seventy-five dollars ($1,175.00), that rate being the prorated monthly rental for one half month. This lease will automatically renew each calendar month...

FIG. 8

```
<html>
<head>
</head>
<body>

<p> This is a technical term</p>

</body>
<html>
```

FIG. 12A

```
<html>
<head>
<script type= "text/javascript" src= "javaScript/atle.js"></script>
</head>
<body>
<?ATLEESTART?>
<p>This is a <span class= "atlee" onmouseover= "atleeLookup(this, 'en')"> technical </span> term</p>
<?ATLEESTOP?>
</body>
<html>
```

FIG. 12B

AUTOMATIC TECHNICAL LANGUAGE EXTENSION ENGINE

CROSS-REFERENCE TO RELATED APPLICATION

This application claims the benefit of Provisional Patent Application No. 61/294,364, filed Jan. 12, 2009.

TECHNICAL FIELD

The present invention is related generally to the Internet, including particularly to web pages, web sites, web-page hosting, and Internet-related service provision.

BACKGROUND

The Internet has grown, during the past 15 years, to be a major, world-wide medium for information transfer and commerce. There are currently many tens of billions of web pages available for access through the Internet. Internet sites hosted in countries around the world provide for information exchange and commercial transactions in many different languages. The number of web pages, information content of web pages, and higher-level organization of web pages through links and other organizational tools is highly dynamic and changes dramatically over relatively short time spans, which involves enormous time and expense for creating automated-web-page-update facilities and for manual creation and editing of web pages. Because the Internet has become a truly global communications medium, provision of web-page content that is comprehensible to speakers of a variety of different languages may be increasingly desirable. Web site developers and web-page providers recognize advantages in continued research and development efforts directed towards facilitating web-page-content comprehension by speakers of different languages.

SUMMARY

Certain embodiments of the present invention are directed to methods and systems for facilitating comprehension of web pages by non-native speakers of the base language in which the web-page content is provided. In certain embodiments of the present invention, selected base-language terms of a web page are automatically linked with translations of the terms, into one or more target languages, that are stored in a computer-readable database or other computer-readable repository. A web-page-reader's browser is enhanced by the system to provide translations of terms within the web page from the base language of a rendered web page to the reader's native language or another target language selected by web-page reader, facilitating the web-page-reader's comprehension of the base-language content within the web page. In alternative embodiments of the present invention, selective term translation is provided to users of various additional types of information display systems, including electronic-book displays, mobile phones, and other information-display devices.

BRIEF DESCRIPTION OF THE DRAWINGS

FIG. 4 shows a representation of a term-translation-enabled web page, according to one embodiment of the present invention.
FIG. 5 shows base-language content that appears within a web page.
FIG. 6 shows the term-translation-enabled base-language content shown in FIG. 5, according to one embodiment of the present invention.
FIG. 7 shows display of an English-to-French term translation, according to one embodiment of the present invention.
FIG. 8 shows display of an English-to-Japanese term translation, according to one embodiment of the present invention.
FIGS. 12A-B illustrate simple examples of an unenhanced web-page description and a term-translation-enhanced web-page description according to one embodiment of the present invention.

DETAILED DESCRIPTION

Figure 1:
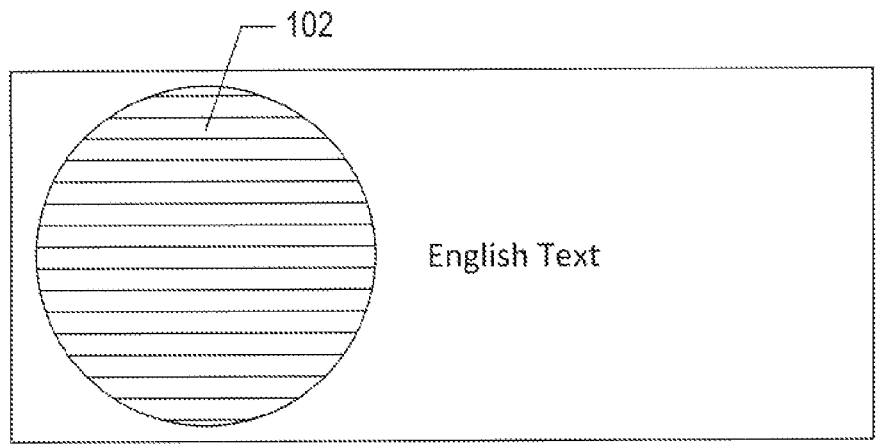
FIG. 1 shows a representation of a base-language web page.

Most attempts to deal with facilitating comprehension of base-language content in web sites by non-native-base-language speakers involve translating the base-language content of web pages. Translation may be carried out manually, by automated translation methods, or by a combination of manual and automated translation, but, however undertaken, generally involves an attempt to make a full semantic, contextual translation of all or a significant portion of the web-site content. Unfortunately, both manual and especially automated translation are error prone, and both can involve expenditure of significant time and money to translate and then properly reformat web-page content.

Embodiments of the present invention use a different approach to facilitating web-site-content comprehension than the currently-used translation-based methods. One embodiment of the present invention is an Automatic-Technical-Language-Extension Engine ("ATLEE") that, rather than attempting to translate language in context, instead enhances a web page by transforming the web page into a corresponding term-translation-enabled web page. The ATLEE automatically identifies and provides an option for translation of certain terms which have been specified to potentially cause comprehension difficulties for non-native speakers of the base language.

In many cases, the web-page content is provided in the English language, and the ATLEE transforms the web page into a term-translation-enabled web page that can be viewed, using a browser as automatically enhanced by the system, or using other viewing means, by speakers of languages other than English for which term translations have been provided in a database or other computer-accessible repository of term translations. In certain of these cases, the ATLEE-based method assumes that: (1) there is a common business and technical language in the world, namely English; (2) most business customers can read English grammar and standard vocabulary; (3) certain industry-specific terms and phrases, usually nouns and sometimes verbs, are rarely used in common conversation, but are needed for certain business purposes, and are thus hindrances to the understanding of English content by non-native English readers; (4) help, on demand, for just those certain industry-specific terms and phrases is sufficient to make the meaning clear to those non-native business English reader; (5) help for any specific term need only be used once or a few times for any individual reader, and thereafter should not be constantly or permanently provided, as constantly-provided or permanently-provided help may constitute a hindrance to reading the document in English; and (6) the certain industry-specific terms and phrases can be packaged into discrete databases, used for automatic extension to specific language speakers, and suffice to make the overall meaning clear. However, term translation may also be provided in many different contexts, including to facilitate reading of electronic books and Internet-provided books, stories, and poetry by non-native readers of the language in which the books, stories, and poetry is displayed. Term translation may also be incorporated into language-education web sites and electronic products.

By feeding a text-based document description through the ATLEE, prior to furnishing the text-based document description for rendering and display, certain specific terms and/or phrases can be identified as terms and/or phrases for which language extension, specific to the reader's preferred extension language, is available. The identified terms can then be selectively translated upon user input indicating the reader's desire for a translation of the terms.

Full automated translation of entire documents or sections of a document, in many cases, is counterproductive. Full automatic translations are often mistake-laden and therefore misleading or incorrect. Leaving term translations in place at all times makes a document less readable and is not necessary for most readers once they have seen the term translated once or twice. Increasing the power of term translation, rather than complete text translation, is the fact that descriptions or explanations of common usage, or explanations specifically tailored to a particular document, can be built into the term-translation method. An added benefit is that the base-language layout is not affected, in any way, because the base language terms remain in place. The target language terms and definitions, which may be shorter or longer than their base language counterparts, only appear in a floating box above the base language text when their appearance is requested by reader input. Another advantage is that, in many cases, readers find it more interesting and pleasing to read web pages in their original base language, when possible, which the ATLEE facilitates by providing term and/or phrase translations on demand. The ATLEE approach involves far lower time and financial overhead for web-site developers and hosters than manual or automated translation. The term and/or phrase translations are provided only when requested, wherever in a web page or web site a reader happens to need them, and avoids the otherwise complex and error-prone task of trying to ascertain where, in a web site, assistance should be provided. In many cases, the reader may be perfectly familiar with all but one term in a document, and therefore the presence of the extra translations and explanations of terms with which he/she is familiar would make the document less readable. By just changing the targeted database of term and/or phrase translations, the same document can be presented to different audiences within the same language. Thus for an English medical journal article, one database might be used for French physicians, while another might be used for French medical students, with the latter identifying more terms, with additional French language explanations for each term.

Figure 2:
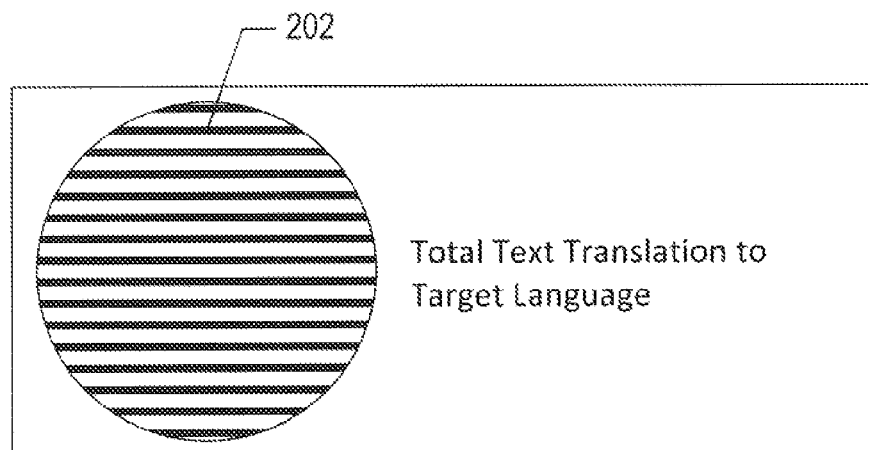
FIG. 2 shows a representation of a translated web page.
Figure 3:
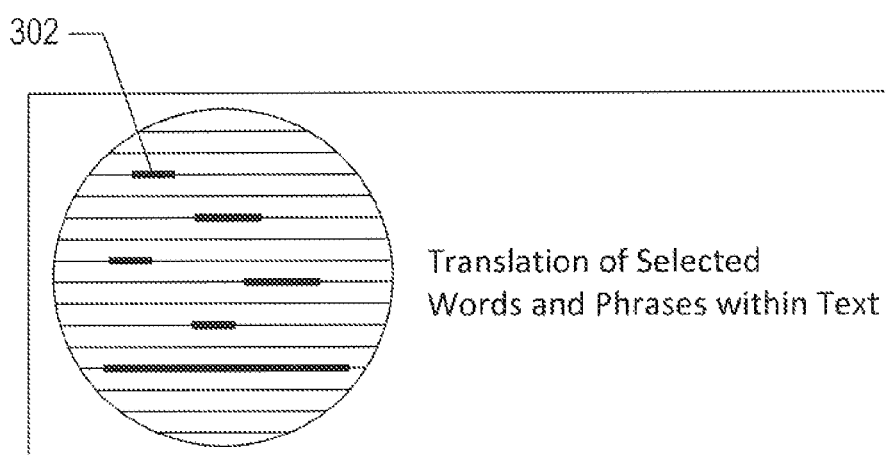
FIG. 3 shows a representation of a selectively-translated web page.

Graphically, one can represent different methods for facilitating comprehension of base-language web pages as follows. FIG. 1 shows a representation of a base-language web page. In FIG. 1, base text is represented by the relatively thin black lines, such as line 102, within the circle, which represents the text content of the document. FIG. 2 shows a representation of a translated web page. In FIG. 2, the entire base text has been translated to the target language, represented by all of the lines now being thickened, or bolded, such as line 202. FIG. 3 shows a representation of a selectively-translated web page. In FIG. 3, only specific base language terms, such as the term represented by a bolded line segment 302, have been translated into a target language, replacing the base language terms throughout the content document. FIG. 4 shows a representation of a term-translation-enabled web page, according to one embodiment of the present invention. In this case, the original base language text is left intact, but the specific terms have been highlighted in some way, in FIG. 4 represented by rectangular windows over portions of the text, such as rectangular window 402, and linked logically to an external database of translated terms and explanations in the target language. A user can input a request for translation of particular terms, during display of the web page.

An example of how Automated Technical Language Extension would look to the reader, or viewer, of the electronic document is next illustrated. FIG. 5 shows base-language content that appears within a web page. In FIG. 5, a section of a typical residential lease is displayed as it normally would be in the base language, in this case English. There is no translation of terms. FIG. 6 shows the term-translation-enabled base-language content shown in FIG. 5, according to one embodiment of the present invention. In FIG. 6, the text from the lease in FIG. 5 has been passed through the Automatic Technical Language Extension Engine. Each term that appears in the ATLEE database has been highlighted, in this case by a double underline. FIG. 7 shows display of an English-to-French term translation, according to one embodiment of the present invention. In FIG. 7, the cursor, in this case a hand with a pointing finger, has been moved over the term "Lessee." The target language on this viewer's system has been set to French. Since there is no direct translation of the English word "lessee" into French, the word "locataire," which directly translates into English as "tenant," is displayed in the box floating over the page, and the explanatory text "à bail," meaning "with lease," has been included. FIG. 8 shows display of an English-to-Japanese term translation, according to one embodiment of the present invention. In FIG. 8, the viewer has changed the target language of their system to Japanese, and the direct translation form the Japanese database for "Lessee" is now displayed.

It should be noted that, in addition to facilitating reading of web pages by non-native readers of the base language in which the web page is rendered, ATLEE can be employed to provide same-language definitions and explanations of technical and scientific terms to non-technical and non-scientific readers of a technical or scientific document. ATLEE can also be used to provide annotations to textual content in the base language.

ATLEE is achieved conceptually by placing an Automatic Technical Language Extension Engine between the original document content and the display system. In the case of a web page, a web-page description file, including text in its original language, resides on a web server. When a client browser accesses the page, the ATLEE loads an "agent," in one embodiment of the present invention a JavaScript, onto the client which checks the client's browser for a primary language, and then loads the appropriate language term database onto the client. The engine also causes the hypertext markup language ("HTML") rendered for display by the browser to highlight the specific terms and phrases which appear on that page, which are also contained in the downloaded DB. Then when the viewer moves the cursor over the highlighted text, a definition, and sometimes a further explanation from the target language database, is displayed over the document as an "extension" of the original language document. In alternative embodiments of the present invention, term translations are requested, in response to reader input, by the client-side browser from the web server, rather than transferred initially to the client computer. Furnishing translations on demand can provide greater efficiency for web pages that display a large amount of text and the dictionary of term translations is large.

The target language used by the agent can be overridden by the agent as defined by settings in the user's session. Thus, although a user might be in Sweden, with the browser's primary language set to Swedish, the user can make a choice through the user's browser to set the target language to French, in which case the agent would automatically use a French-language database in the display of translations and explanations. Furthermore, the language databases can exist as services which can be provided by a remote server or servers. Thus a French database of legal terms and explanations might be hosted, and maintained by a legal organization in France, and provided to ATLEE engines which exist on servers anywhere in the world. The client might be in France, reading a document in English on a U.S. hosted website, and the ATLEE engine on that website would be drawing its term and explanation database from the service hosted in France.

When there is a "one-to-multiple" relationship between a base language term and target language terms, then there are at least three methods by which the ATLEE can handle the multiplicity of definitions. As one example, the single term "lease" might be interpreted as a noun or a verb form. The methods for handling such multiplicities include: (1) including all versions of the target language term in the floating extension box, using one line for each entry in the database (one term translation, and optionally one explanation/context example each); (2) connecting to an outside contextual translation technology for selection of an appropriate definition; and (3) encoding the term within the original document to point to a specific entry in the target language term database. As one example, in the third method, the term can be enclosed within a "span" tag in HTML, with an attribute which specifies the term to be displayed from the target language term database. This does not affect how the term would appear in a version of the document which was not passed through the ATLEE, and it would appear as any other term marked for translation would if passed through the ATLEE.

Figure 9:
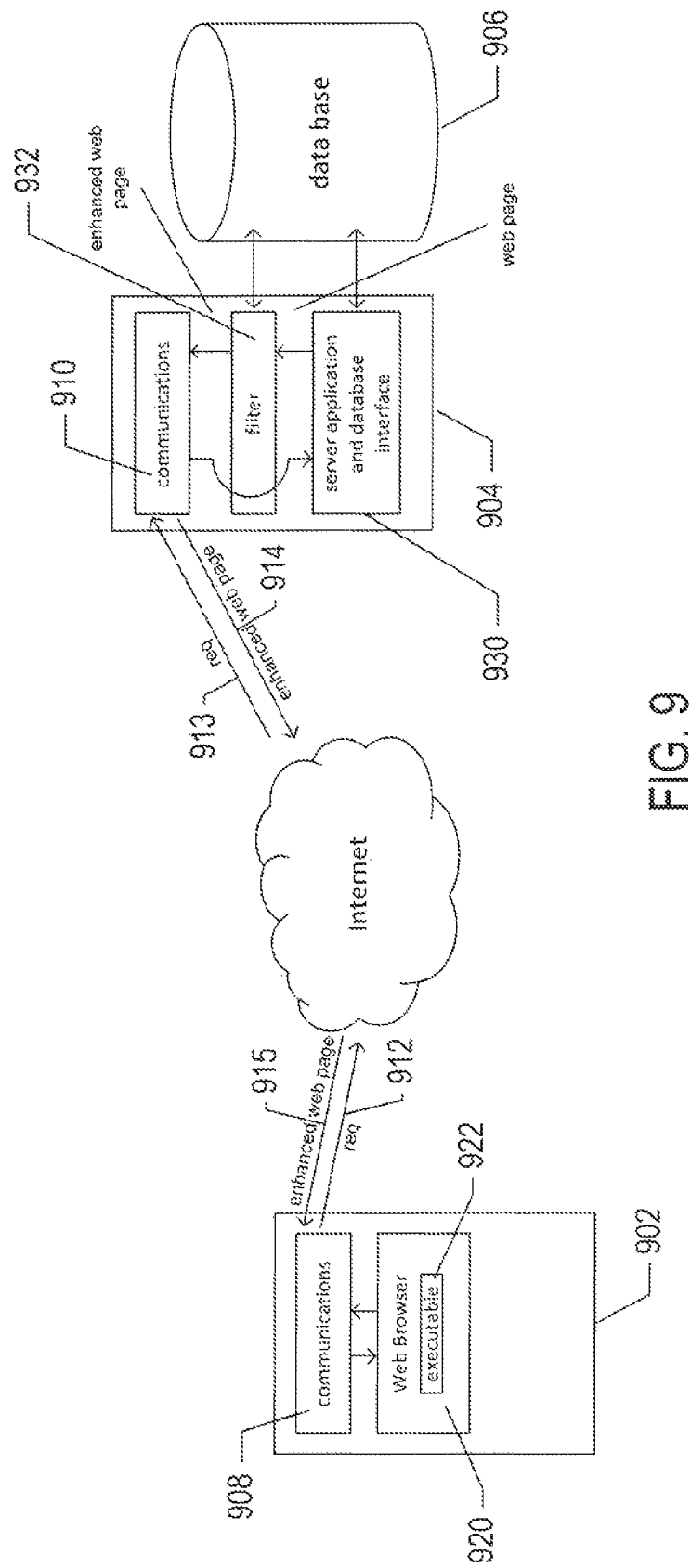
FIG. 9 illustrates an example implementation of a term-translation system that represents one embodiment of the present invention.

FIG. 9 illustrates an example implementation of a term-translation system that represents one embodiment of the present invention. The components of the term-translation system are illustrated, in FIG. 9, within an example client computer 902, an example web server 904, and a database system 906 that may be a component of the web server or that may be a separate computational entity accessed by the web server. Both the client computer 902 and the web server 904 contain communications software and hardware 908 and 910, respectively, that allow the client computer to send requests to the web server 912-913 and allow the web server to respond to those requests 914-915. A commonly made request by the client computer is a request for a term-translation-enabled web page, to which the web server responds by sending a term-translation-enabled web-page description, such as an enhanced HTML file, to the client computer. Both the client computer and web server include operating systems and systems libraries that provide application-execution environments, in the case of the client computer, and web-server-application execution environments, in the case of the web server. These software components of the client computer and web server, as well as the large number of hardware components in each computer, are not further described, since these components are commonly available and well known to those familiar with Internet-based application and systems programming.

The client computer additionally includes a web-browser application program 920 that executes a term-translation script or other executable 922 that implements the client portion of term translation on the client computer during display of term-translation-enhanced web pages. In addition, the client-side web browser 920 also generally includes a plug-in or other enhancement that provides a user interface to users of the web browser on the client computer that allow the users to turn on and turn off term translation and to specify the values of various parameters associated with term translation, including the target language for term translation and a particular term-translation database service or class of term-translation database service to be used by the web server for term-translation-enhancement of web pages returned to the client computer by the web server. Thus, in the described implementation of the term-translation system that represents one embodiment of the present invention, relatively little term-translation enhancement is included on the client side, the bulk of which is supplied by scripts included in, or requested from, term-translation-enabled web-page descriptions.

The web server 904 includes an enhanced web-server application with a term-translation-database interface 930 as well as a web-page filter 932 that provides term translations to client computers. The web server includes, or accesses, a term-translation database within a local or remote database system 906. The database system may be a relational database management system or other such database management system, or may, in alternative embodiments of the present invention, comprise one or more formatted files that contain the term translations used by the web server to provide specific term translations or translatable terms for enhanced web pages on behalf of client computers. Of course, although FIG. 9 shows a single client computer, a given web server enhanced to provide term translation can currently provide term-translation-enhanced web pages to a large number of client computers. In addition, a particular web server enhanced to provide term-translation-enhanced web pages to client computers may access one or more term-translation databases. At any given point in time, a very large number of web servers may concurrently provide term-translation-enabled web pages to a very large number of client computers.

Figure 10:
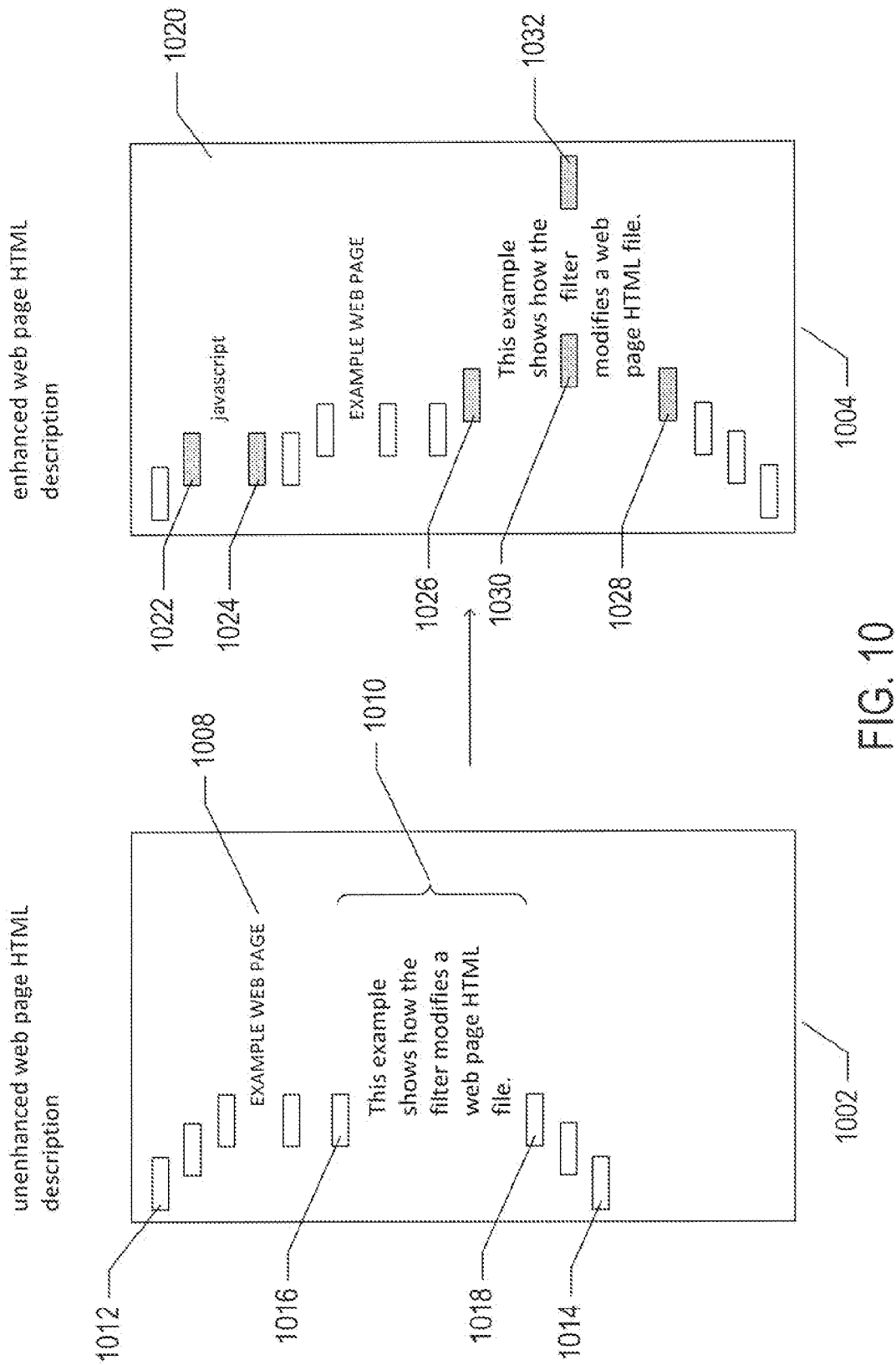
FIG. 10 illustrates term-translation enhancement a web page according to one embodiment of the present invention.

Web servers that implement term translation according to embodiments of the present invention employ a term-translation filter to enhance normal web-page descriptions, such as web-page descriptions comprising HTML files, to produce term-translation-enhanced web pages that are furnished by the web servers to client computers which request term-translation-enhanced web pages. FIG. 10 illustrates term-translation enhancement a web page according to one embodiment of the present invention. In FIG. 10, a normal web-page description 1002 is shown on the left-hand portion of the figure and a corresponding term-translation-enhanced web-page description 1004, produced by a creator or administrator of the web page as well as by the term-translation-filter operation within a web server, is shown on the right-hand portion of the figure. Both the normal and term-translation-enhanced web-page descriptions are simplified, for illustration purposes. The normal web-page description 1002 explicitly shows text that will be displayed on a user display device when the web-page description is rendered by a web browser, and rectangles are used in FIG. 10 to represents non-displayed directives within the web-page description. Thus, when the web-page description 1002 is rendered by a web browser for display, the displayed web page will include the title "EXAMPLE WEB PAGE" 1008 and the sentence "This example shows how the filter modifies a web page HTML file" 1010. In an HTML document, a web-page description comprises hierarchical elements, each element bracketed by a leading tag and an ending tag. The entire web-page description is itself a highest-order element, and is bracketed by a leading tag 1012 and a final tag 1014. The text sentence 1010 is bracketed by lower-hierarchical-level tags 1016 and 1018.

The corresponding term-translation-enhanced web-page description 1004 includes additional elements bracketed by additional initial and final tags, which are shaded, in FIG. 10, for clarity of illustration. The first additional element 1020, bracketed by tags 1022 and 1024, is a set of script routines or, more commonly, a callback that acquires the script routines from the server when invoked by a client-side browser that has not previously cached the script routines. The script routines execute within the browser on the client side to provide term-translation enhancement via a browser-supplied term-translation interface implemented by the script routines and by addition of additional elements into the term-translation-enabled web-page description. In certain embodiments of the present invention, the script routines create a displayable entity that includes the text of term translations and include a callback routine, invoked by a mouse-over event within the client-side browser that requests specific term translations from the server for display to a user. The exact functionality encoded within the script routines may vary across various different implementations of the present invention. Similarly, the method by which the script routines are obtained by the client computer may vary. As one example, when the script routines are obtained by the client-side web browser via a callback to the server, the script routines may be cached by the web browser so that the web browser only requests the script routines from a web server once, or a few times, during the period of time that the web browser executes. Alternatively, the script routines may be included in a plug-in or other executable that is obtained by a user of the client computer through a web-page interface. As mentioned above, the script routines may be alternatively included directly within the term-enhanced web-page description.

The second additional element in the term-enhanced web page is a term-translation region element bracketed by additional tags 1026 and 1028. Term-translation regions are used to define those portions of a web-page description that should be filtered, by a web server, for addition of specific term-translation elements. In other words, the term-translation functionality is applied only to terms included within term-translation regions. Only a single term-translation region, bracketed by tags 1026 and 1028, is shown in FIG. 10. However, the descriptions of web pages may be quite lengthy, and it may include hundreds or more elements, and many different term-translation regions may be defined within such descriptions to confine term translation to only specific portions of a web-page description and to specific portions of a rendered and displayed web page. Both the script routines and term-translation regions are introduced during creation of, or editing of, web-page descriptions in certain embodiments of the present invention. Functionality for adding the script routines and for defining term-translation regions may be added to web-page-creation applications and HTML editors, or the tags and callback routines can be manually added by web-page creators and web-site administrators using HTML editors or text editors. Alternatively, the scripts or callbacks for script acquisition may be added automatically, during web-page-description filtering.

A third type of element added to the enhanced web pages to create term-translation-enhanced web pages comprise term-translation elements corresponding specific terms for which translation may be made available by the term-translation system. For example, in the web-page description 1004, the word "filter" has been enclosed within added tags 1030 and 1032 to identify this occurrence of the word "filter" as being a potentially translatable term. In FIG. 10, only this single occurrence of the word "filter" has been enclosed within additional tags to indicate that this occurrence of the word "filter" is potentially translatable. In an actual web-page description, there may be tens, hundreds, or more terms that are enclosed within special tags to indicate that the terms are potentially translatable.

Figure 11:
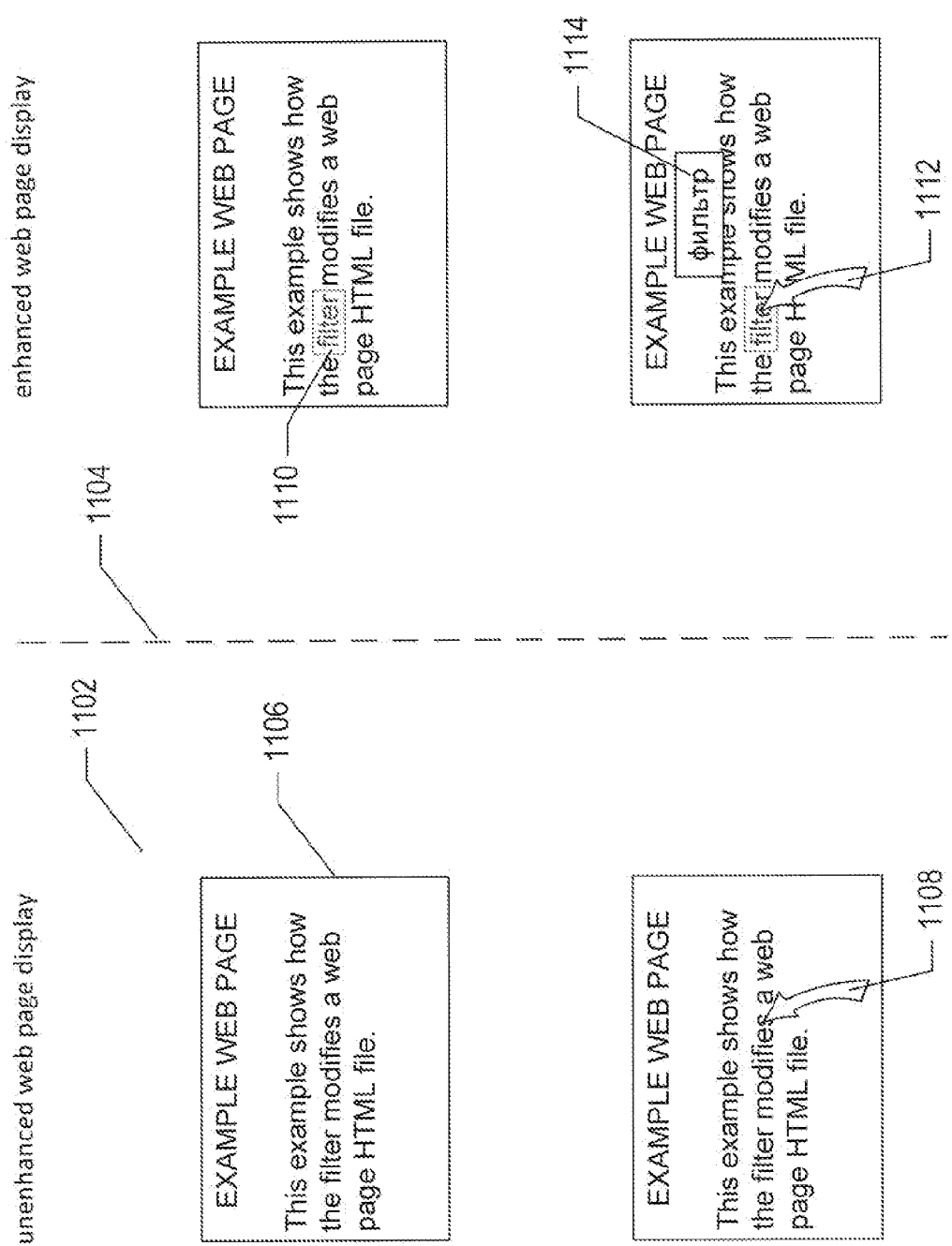
FIG. 11 illustrates rendering and display of web pages corresponding to the unenhanced web-page description and term-translation-enhanced web-page description shown in FIG. 10 according to one embodiment of the present invention.

FIG. 11 illustrates rendering and display of web pages corresponding to the unenhanced web-page description and term-translation-enhanced web-page description shown in FIG. 10 according to one embodiment of the present invention. FIG. 11 is partitioned into a left-hand side 1102, which illustrates rendering and display of the unenhanced web page, and a right-hand side 1104, which illustrates rendering and display of the term-translation-enhanced web page. In the case of the unenhanced web page, rendering and display of the web-page description 1002 in FIG. 10 produces the displayed web page 1106. When a user manipulates a mouse or other input device to position a cursor 1008 over the word "filter," no term translation occurs, since the displayed web page is not enhanced for term translation. By contrast, when the term-translation-enhanced web-page description is rendered and displayed by a web browser, the word "filter" is highlighted 1110 or otherwise visually annotated to indicate that the word may be translated. When a user manipulates a mouse or other input device to place a cursor 1112 over the highlighted word "filter," a translation 1114 is displayed to the user in a particular target language.

FIGS. 12A-B illustrate simple examples of an unenhanced web-page description and a term-translation-enhanced web-page description according to one embodiment of the present invention. The unenhanced web-page description is shown in FIG. 12A. This web-page description includes seven lines, six of which 1202-1207 include only a single tag and one of which 1208 includes a short text phrase bracketed by a pair of tags. FIG. 12B shows the corresponding term-translation-enhanced web page. The term-translation-enhanced web page description includes a reference to the script files that execute within the browser to provide client-side term-translation functionality 1220, a pair of tags 1222 and 1224 that specify a term-translation region, and a pair of span tags 1226 and 1228 that bracket the word "technical," indicating that the word "technical" is translatable.

It should be noted that, while term-translation enhancement of web pages represents one application domain for embodiments of the present invention, term-translation enhancement can be applied to many other types of information descriptions and information-display systems. For example, the descriptions of text displayed by electronic book readers may be term-translation enhanced to allow for selective, user-requested term translation of displayed books and other documents and information. Information displayed on mobile phones may also be term-translation enhanced.

Figure 13:
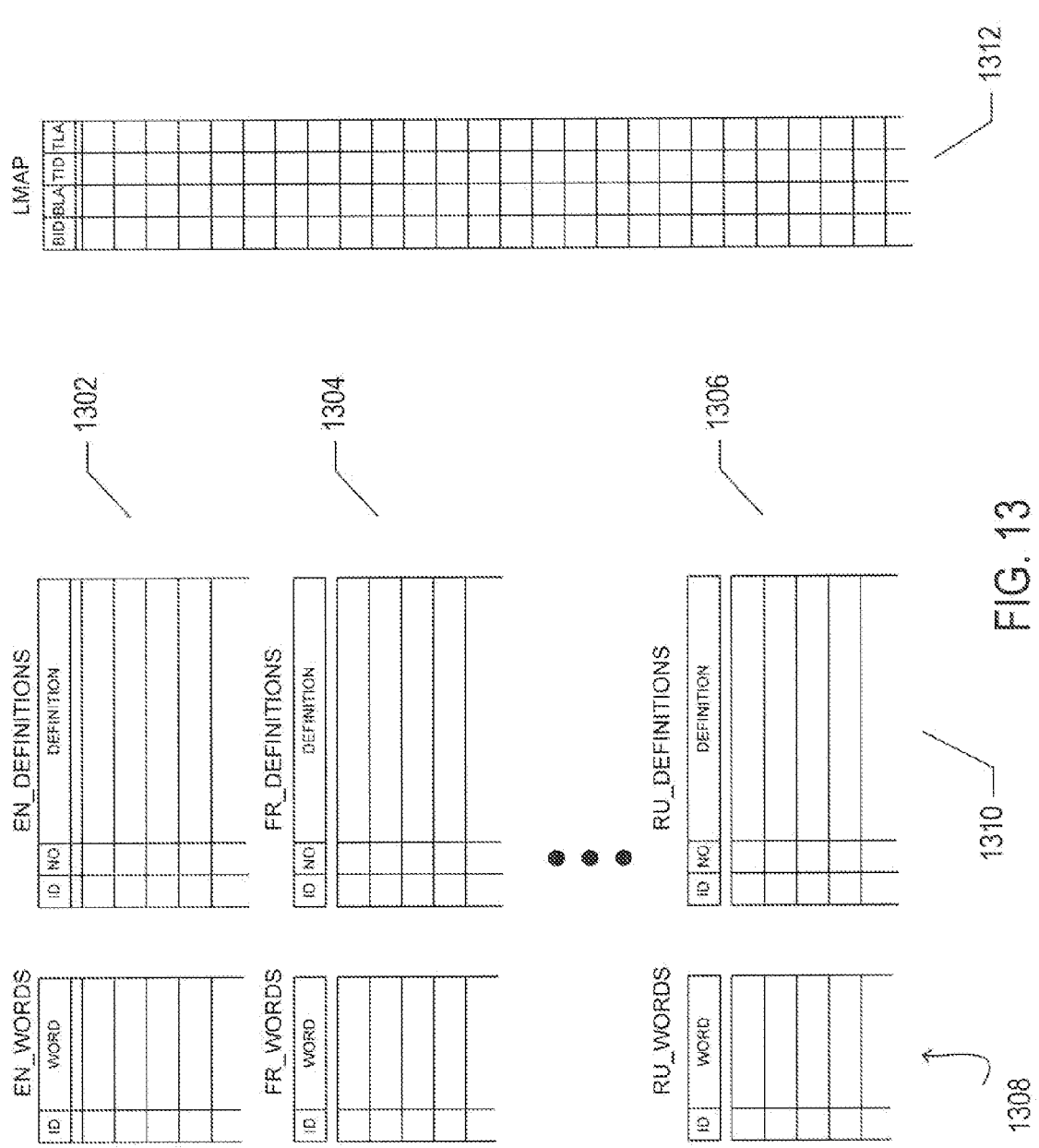
FIG. 13 provides a relational-database schema for a term-translation database according to one embodiment of the present invention.

As discussed with reference to FIG. 9, a web server that provides term translation includes, is associated with, or accesses a database that stores translations. Many different types of databases may be employed in various different embodiments of the present invention. For example, indexed files or even flat files may be used to store term translations. FIG. 13 provides a relational-database schema for a term-translation database according to one embodiment of the present invention. For each language supported by the term-translation system, the schema includes a pair of tables. In FIG. 13, pairs of these tables are shown, in separate rows, for the English language 1302, the French language 1304, and the Russian language 1306. The first table in each pair, in column 1308 in FIG. 13, includes a list of words in the language paired with unique numerical identifiers, or IDs, that numerically identify the word. The second table of each pair, in column 1310 of FIG. 13, includes definitions for words of the language, each definition comprising a text string, and each definition associated, in an entry, with a definition number and with the ID for the word to which the definition corresponds. In alternative embodiments of the present invention, additional subfields, columns, and even tables can be employed to provide for storage of term usage examples, graphics, historical information, and other information related to displayed terms that can be extracted and displayed during rendering and display of information. The table LMAP 1312 provides a mapping between words and definitions of each language supported by the term-translation system and all other languages supported by the term-translation system. Each entry in the table LMAP includes the ID and language identifier for a first word and an ID and language identifier for a second word that corresponds to the first word. The schema illustrated in FIG. 13 treats all languages uniformly. In practice, it is likely that one language will generally serve as a base language and all other languages will serve as target languages for term translation. Thus, the column titles for the LMAP table include initial letters "B" and "T" that stand for "base" and "target," respectively. However, the schema illustrated in FIG. 13 can be used for correlating terms from multiple languages, pairs of which can be selected arbitrarily as the base and target languages.

The following short code examples illustrate use of the relational database schema shown in FIG. 13 to formulate queries in order to obtain information used by the term-translation system. A first function, getTerms, implemented in C++-like pseudocode, returns a list of words in a base language for which translations are available in a target language. The routine constructs a relational query and then passes the query to a database for execution:

```
bool getTerms (string baseL, string targetL, database d, list l)
{
    query q;
    string table;
    switch (baseL)
    {
        case 'EN' : table = "EN_WORDS";
            .
            .
        case 'RU' : table = "RU_WORDS";
    }
```

```
    q = "SELECT WORD FROM" | table |
        "WHERE" | table | ".ID IN
        (SELECT BID FROM LMAP
            WHERE LMPA.BLA = "' | baseL |
        "'    AND LMAP.TLA = "' | targetL |
            "';"';
    return (l.addList(d.execute(q)));
}
```

The following structured query language ("SQL") commands create a table of translations, which includes entries comprising a word from the target language, the corresponding definition, and the definition number for the definition, and populates the translations table with target-language words and definitions corresponding to a particular base-language word. For simplicity and clarity of illustration, the SQL commands are hard coded to find the Russian translation or translations for the English-language word "filter." Similar SQL routines can be embedded in a procedural programming language, as in the example of the function "getTerms," provided above, to find translations for words specified parametrically:

```
CREATE TABLE TRANSLATIONS
(       WORD VARCHAR (20),
        DEFINITION VARCHAR (100),
        DEFNO INTERGER);
INSERT
INTO    TRANSLATIONS (WORD, DEFINITION, DEFNO)
        SELECT RW.WORD, RD,DEFINITION, RD.NO
        FROM RU_WORDS RW, RU_DEFINITIONS R.D
        WHERE EN.WORD = 'filter'
            AND LMAP.BLA = 'EN'
            AND LMAP.TLA = 'RU'
            AND RW.ID = EN.ID
            AND RW.ID = RD.ID
        ORDER BY 1, 3;
```

Figure 14:
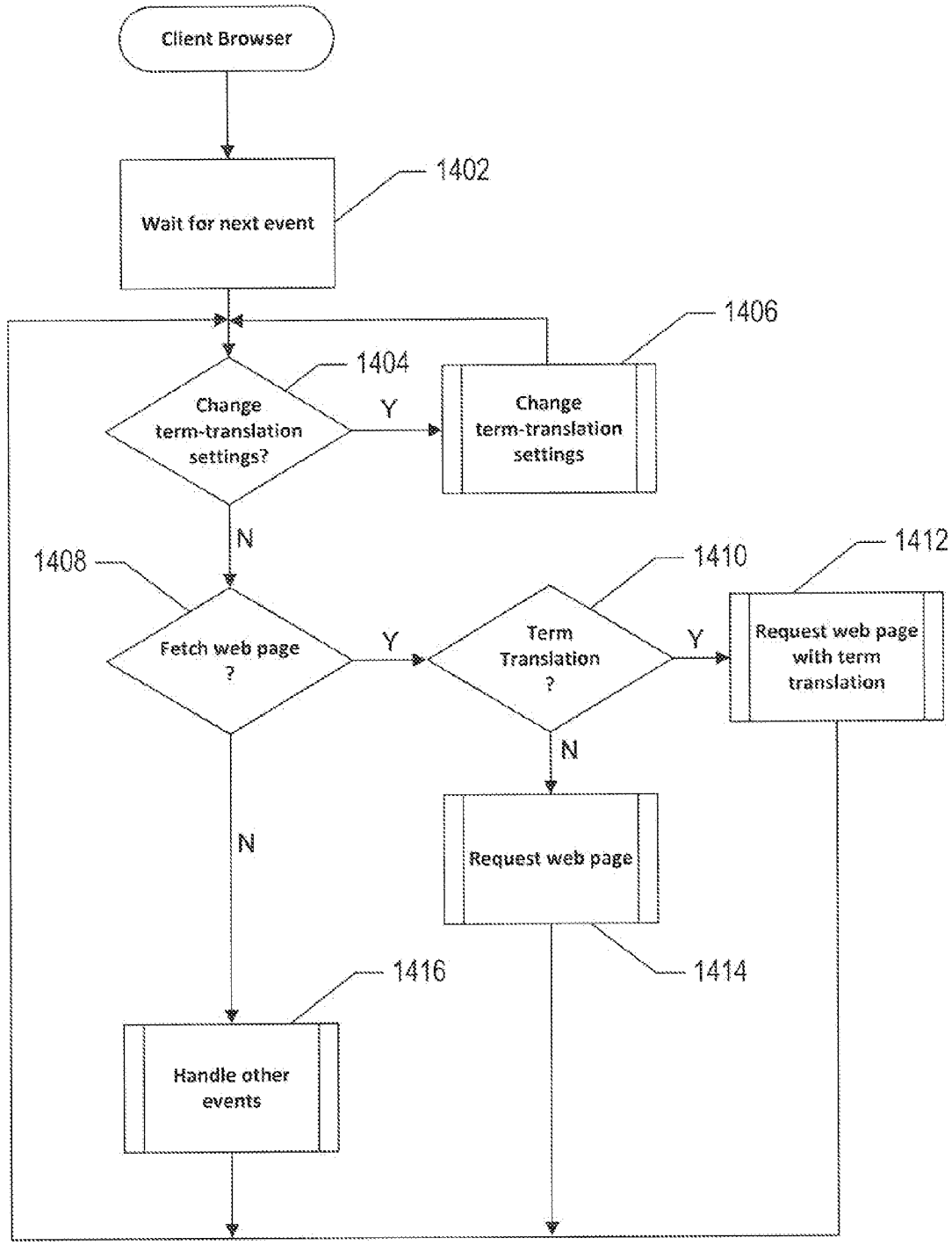
FIGS. 14-16 provide control-flow diagrams for certain components of the term-translation systems that represent certain embodiments of the present invention.
Figure 15:
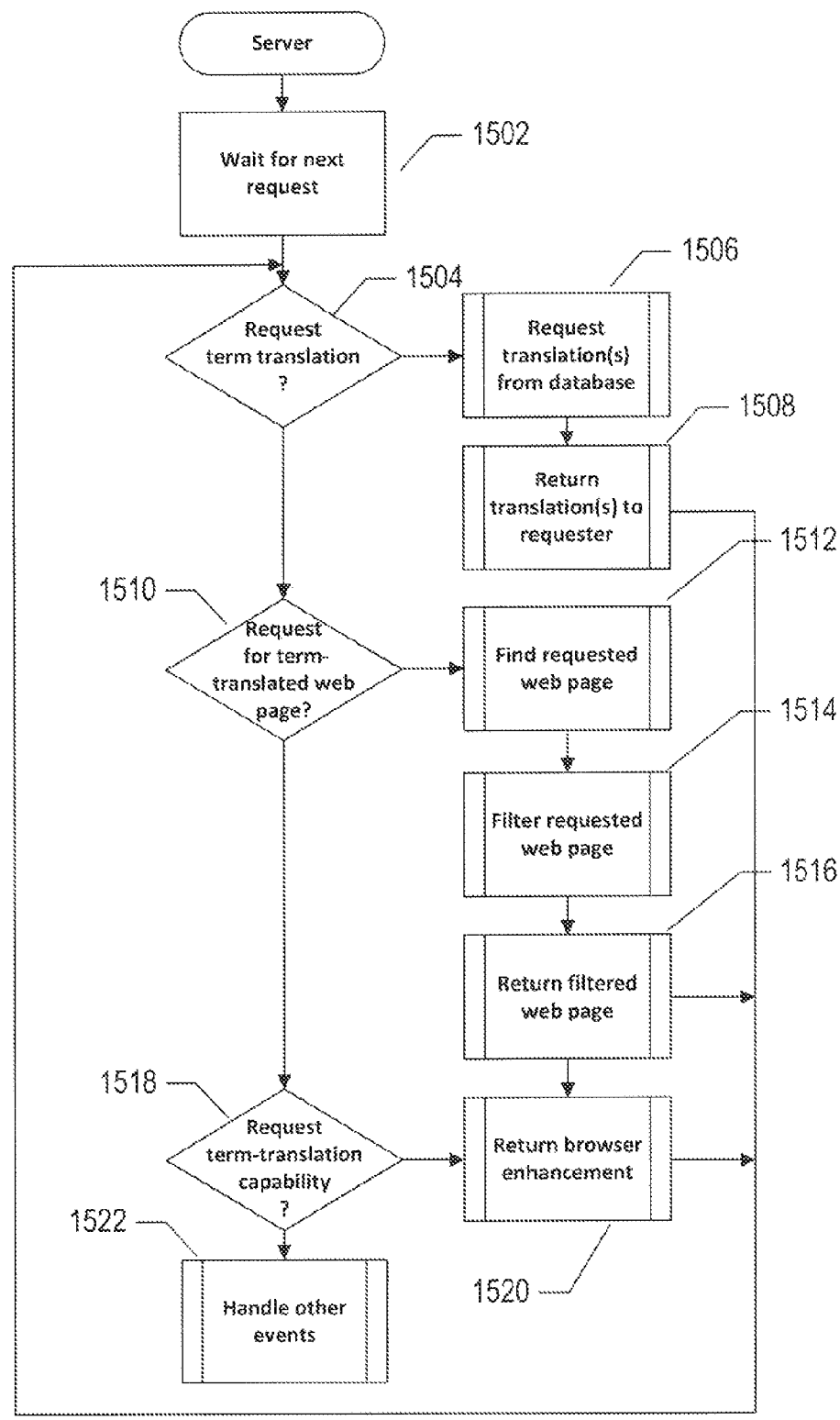
Figure 16:
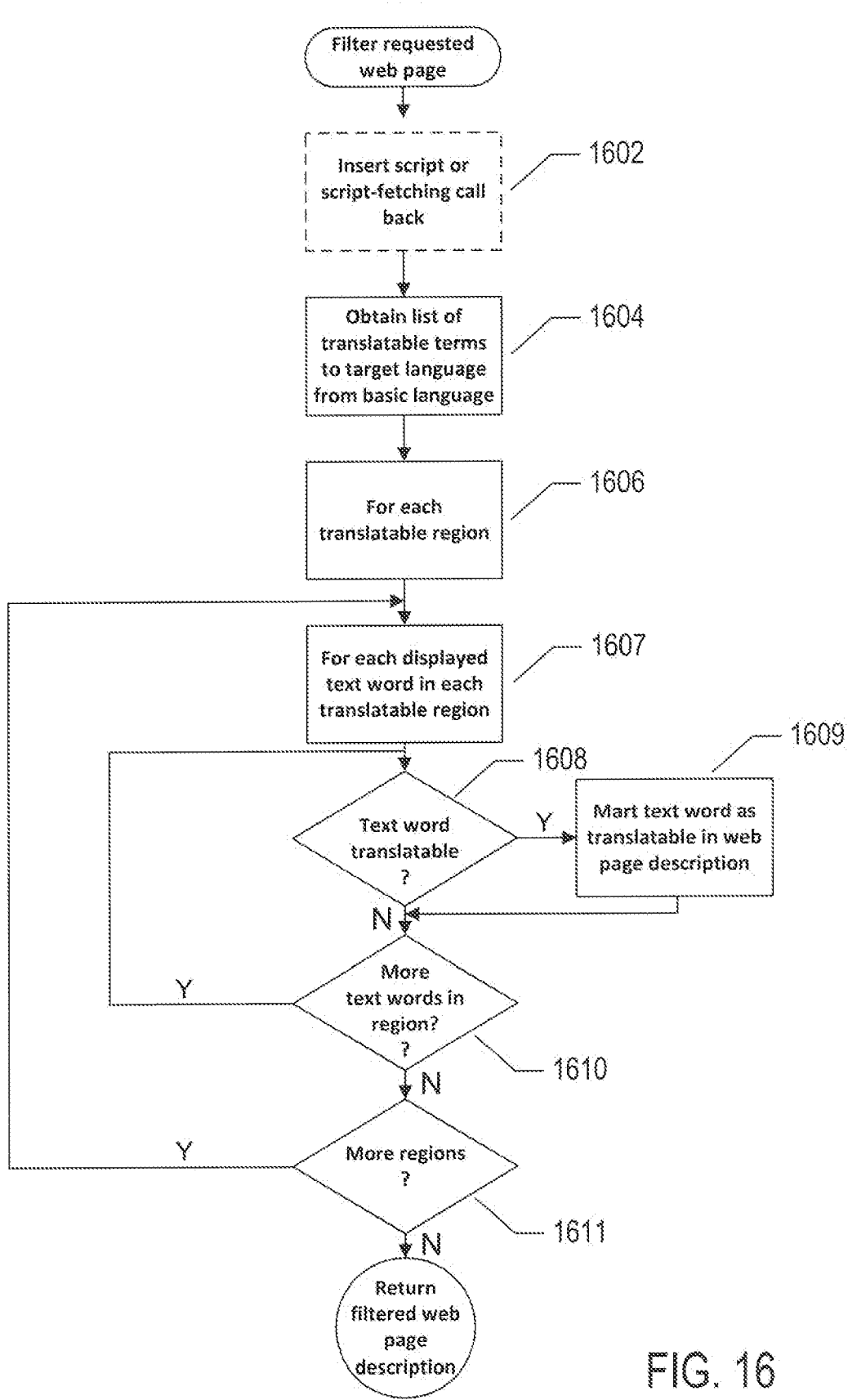

FIGS. 14-16 provide control-flow diagrams for certain components of the term-translation systems that represent certain embodiments of the present invention. FIG. 14 provides a control-flow diagram for the client-side browser that renders and displays term-translation-enhanced web pages to users. The browser is modeled as an event loop. In step 1402, the browser waits for a next event to occur, such as a user-input event. If the next occurring event represents a request, by a client, to change the term-translation settings, as determined in step 1404, then the client browser executes a term-translation settings-change routine 1406. The various different settings and setting values may vary significantly from one embodiment of the present invention to another. In general, a web browser may display tabs or other control features that allow a user to turn on and turn off term translation as well as to select the target language for term translation. Because the settings, setting values, and user interface may vary significantly from one embodiment of the present invention to another, additional details are not provided with respect to term-translation-settings changes. If, instead, the next event is a user-initiated request to fetch a web page from a server, as determined in step 1408, and if term translation is currently activated by the user, as determined in step 1410, then the client browser requests a term-translation-enhanced web page from the server in step 1412. Otherwise, the client browser requests a normal web page in step 1414. For all other events, the event handler shown in step 1416 is invoked. Note that the routine called in step 1412 may, in certain cases, involve a secondary request to obtain the term-translation scripts from the server, and, during display of a term-translation-enhanced web page, those scripts may make user-initiated callbacks to the server in order to obtain specific term translations for words in the web page that are tagged as being translatable, as discussed above. The user-initiated requests for translations are not explicitly shown, in FIG. 14, since they are mediated by the scripts included in, or obtained as a result of, the script-related element added to each term-translation-enhanced web-page description.

FIG. 15 provides a control-flow diagram for a web server that supports term translation. As with the control-flow diagram shown in FIG. 14, the control-flow diagram shown in FIG. 15 is modeled as an event loop. In step 1502, the server waits for a next request from a client computer. If the next request is a request for a specific term translation, as determined in step 1504, the server requests a translation from the database, in step 1506, and returns the translation or translations to the client computer in step 1508. As mentioned above, a given base-language word may correspond to one or several words in the target language. Moreover, each target-language word corresponding to a base-language word may be associated with one or more translations. Thus, a request for term translation may return multiple target-language terms, each associated with multiple definitions. In certain cases, a user may wish to see all possible corresponding target-language words and definitions. In other cases, the creator or manager of a web page may identify, within the element corresponding to a potentially translated word, specific corresponding target-language words and specific definitions associated with those target-language words, to return to a user when a user requests term translation. The definition number associated with definitions can be employed to facilitate specification of specific definitions to return to a user for a particular term within a web-page description. If the next request is instead a request for a term-translation-enhanced web page, as determined in step 1510, then the server finds the requested web page, in step 1512, filters the requested web page to add paired tags to bracket each base-language term for which a target-language translation is available, in step 1514, and returns the term-translation-enhanced web page to the client computer in step 1516. If, instead, the request is a request from the client computer for term-translation capability, as determined in step 1518, then the server returns a browser plug-in and/or other executables and scripts to provide client-side functionality on the client computer in step 1520. All other server events are handled by the event handler shown in step 1522. Inspection of FIGS. 14 and 15 again reveal, as discussed above, that the modifications necessary to the web server and client computer to implement term translation according to the present invention are relatively modest.

FIG. 16 is a control-flow diagram for the filter functionality executed by a web server that supports term translation in order to complete enhancement of a web page. In step 1602, the filter may insert a script or script-fetching element, in certain embodiments, in which the script or script-fetching element is not included by the web-page creator or administrator. In step 1604, the web server requests a list of potentially translatable terms in the base language of the web page to the target language specified by the requesting user. In the nested for-loops of steps 1606-1611, the web-page description is parsed to identify all term-translation regions. For each term-translation region, identified by the outer for-loop, an inner for-loop of steps 1607-1610 considers each potentially displayed text word in the currently-considered translatable region. For each displayed text word, the filter searches for the word in the list of translatable terms, obtained in 1604, to determine whether or not the word is translatable. When a word is translatable, as determined in step 1608, the filter brackets the word with tags in order to mark the word as translatable in the web-page description.

Finally, actual implementation code from one embodiment of the present invention is next provided. First, the Java script executed on the client side in order to implement term translation, for one embodiment of the present invention, is provided below:

```
var theAtleeObject;
var atleeToolDiv = document.createElement("div");
atleeToolDiv.setAttribute("id", "atleeTipDiv");
atleeToolDiv.setAttribute("class", "atleeTip");
function dropAtleeDiv( ) {
   theAtleeObject.removeChild(atleeToolDiv);
}
function atleeCallback(req) {
   var TransText =
JSON.parse(req.xhRequest.responseText).definitions[0].TransText;
   var Description =
JSON.parse(req.xhRequest.responseText).definitions[0].Description;
   atleeToolDiv.innerHTML = "<div class=\"atleeTrans\">" +
TransText + "</div><div class=\"atleeDef\">" + Description + "</div>";
   theAtleeObject.appendChild(atleeToolDiv);
   theAtleeObject.onmouseout = dropAtleeDiv;
}
function atleeLookup(term, lang) {
   theAtleeObject = term;
   var req = Spry.Utils
            .loadURL(
               "POST",
               "/control/getAtleeTranslation",
               true,
               atleeCallback,
               {
                  postData : "langId=" + lang + "&term="
                     + escape(term.innerHTML),
                  headers : {
                     "Content-Type" :
"application/x-www-form-urlencoded; charset=UTF-8"
                  }
               });
}
```

Next, an implementation of the filter functionality that runs on the web server, described above, is provided in Java:

```
package com.maverick.tomcatfilters;
import java.io.IOException;
import java.io.PipedInputStream;
import java.util.ArrayList;
import java.util.Iterator;
import java.util.Map;
import java.util.regex.Matcher;
import java.util.regex.Pattern;
import javax.servlet.Filter;
import javax.servlet.FilterChain;
import javax.servlet.FilterConfig;
import javax.servlet.ServletException;
import javax.servlet.ServletRequest;
import javax.servlet.ServletResponse;
import javax.servlet.http.HttpServletRequest;
import javax.servlet.http.HttpServletResponse;
import org.ofbiz.base.util.UtilHttp;
import org.ofbiz.base.util.UtilMisc;
import org.ofbiz.entity.GenericDelegator;
import org.ofbiz.service.GenericDispatcher;
import org.ofbiz.service.GenericServiceException;
import org.ofbiz.service.LocalDispatcher;
public class AtleeFilter implements Filter {
   protected FilterConfig config;
   private String jsEvent = "onmouseover";
   private String jsFunction = "atleeLookup(this,'en')";
   private String atleeClassname = "atlee";
   private String leaveEvent = "onmouseout";
   private String leaveFunction = "hideddrivetip( )";
   private long idNum = 0;
   private static Pattern body = Pattern.compile("<body.*?(.+)</body>",
      Pattern.UNICODE_CASE | Pattern.CASE_INSENSITIVE |
Pattern.DOTALL);
```

```
    private static Pattern atleeBlock = Pattern.compile(
        "<\\?ATLEESTART.*?\\?>(.*?)<\\?ATLEESTOP.*?\\?>",
        Pattern.CASE_INSENSITIVE | Pattern.DOTALL);
    private static Pattern markup = Pattern.compile(
        "<script.*?>.+?</script>|<style.*?>.+?</style>|<.*?>",
        Pattern.UNICODE_CASE | Pattern.CASE_INSENSITIVE |
Pattern.DOTALL);
    public static String findBody(String s) {
        Matcher mbb = body.matcher(s);
        if (mbb.find())
            return mbb.group(1);
        return s;
    }
}
public String getJsEvent() {
    return jsEvent;
}
public void setJsEvent(String jsEvent) {
    this.jsEvent = jsEvent;
}
public String getJsFunction() {
    return jsFunction;
}
public void setJsFunction(String jsFunction) {
    this.jsFunction = jsFunction;
}
public String getAtleeClassname() {
    return atleeClassname;
}
public void setAtleeClassname(String atleeClassname) {
    this.atleeClassname = atleeClassname;
}
public static ArrayList<String> findATLEEBlocks(String s) {
    ArrayList<String> matching = new ArrayList<String>();
    Matcher mab = atleeBlock.matcher(s);
    while (mab.find()) {
        matching.add(mab.group(1));
    }
    return matching;
}
public static ArrayList<String> getTextSections(String s) {
    ArrayList<String> textSections = new ArrayList<String>();
    String[] sections = markup.split(s);
    for (String section : sections) {
        if (section.length() > 0 && !section.contentEquals("\n")
            && !section.contentEquals("\r"))
            textSections.add(section);
    }
    return textSections;
}
public String atleeHTMLReplace(String s, ArrayList<String> keywords) {
    return atleeHTMLReplace(s, atleeClassname, jsEvent, jsFunction,
        keywords);
}
public String atleeHTMLReplace(String s, String classname,
    ArrayList<String> keywords) {
    return atleeHTMLReplace(s, classname, jsEvent, jsFunction, keywords);
}
public String atleeHTMLReplace(String s, String classname, String
    jsEvent, ArrayList<String> keywords) {
    return atleeHTMLReplace(s, classname, jsEvent, jsFunction, keywords);
}
public String atleeHTMLReplace(String s, String classname, String event,
    String function, ArrayList<String> keywords) {
    Iterator<String> keyit = keywords.iterator();
    while (keyit.hasNext()) {
        Pattern p = Pattern.compile("(\\W+)(" + keyit.next()
            + ")(\\W+|\\Z)", Pattern.UNICODE_CASE
            | Pattern.CASE_INSENSITIVE | Pattern.DOTALL);
        Matcher m = p.matcher(s);
        s = m.replaceAll("$1<span class=\""
            + classname.trim() + "\" " + event + "=\"" + function
            + "\">$2</span>$3");
    }
    return s;
}
public void init(FilterConfig config) throws ServletException {
    this.config = config;
}
public void destroy() {
}
@SuppressWarnings("unchecked")
public void doFilter(ServletRequest request, ServletResponse response,
    FilterChain chain) throws ServletException, IOException {
    HttpServletRequest httpRequest = (HttpServletRequest) request;
    String langcode = UtilHttp.getLocale(httpRequest).getLanguage();
    String fullUrl = UtilHttp.getFullRequestUrl(httpRequest).toString();
    String text = null;
    if (langcode.equalsIgnoreCase("en")) {
        chain.doFilter(request, response);
    } else {
        ServletResponse newResponse = response;
        if (request instanceof HttpServletRequest) {
            newResponse = new CharResponseWrapper(
                (HttpServletResponse) response);
        }
        chain.doFilter(request, newResponse);
        Boolean isHTML = newResponse.getContentType() == null ? false
            : newResponse.getContentType().contains("html");
        if (isHTML) {
            if (newResponse instanceof CharResponseWrapper) {
                System.err.println("Running ATLEE on: " + fullUrl);
                text = newResponse.toString();
                if (text == null) {
                    return;
                }
                GenericDelegator delegator = GenericDelegator
                    .getGenericDelegator("default");
                LocalDispatcher dispatcher = GenericDispatcher
                    .getLocalDispatcher("ATLEEdispatcher", delegator);
                Map<String, String> context = UtilMisc.toMap("langId",
                    langcode);
                this.setJsFunction("atleeLookup(this,'" + langcode + "')");
                Map<String, Object> result = null;
                try {
                    result = dispatcher
                        .runSync("getAtleeKeywords", context);
                    ArrayList<String> keywords = (ArrayList<String>) result
                        .get("keywords");
                    if (keywords != null) {
                        ArrayList<String> regions = findATLEEBlocks(text);
                        Iterator<String> itreg = regions.iterator();
                        while (itreg.hasNext()) {
                            String region = itreg.next();
                            ArrayList<String> sections =
getTextSections(region);
                            Iterator<String> secrep = sections.iterator();
                            while (secrep.hasNext()) {
                                String section = secrep.next();
                                String atrep = atleeHTMLReplace(section,
                                    keywords);
                                if (!section.contentEquals(atrep))
                                    text = text.replace(section, atrep);
                            }
                        }
                    }
                    response.setContentLength(text.length());
                    response.getWriter().write(text);
                } catch (GenericServiceException e) {
                    e.printStackTrace();
                    System.err.println("**** in ==> " + fullUrl);
                }
            } else {
                return;
            }
        } else if(newResponse.getContentType() != null &&
response.getContentType().contains("json")){
            text = newResponse.toString();
            response.getWriter().write(text);
        } else {
            newResponse.flushBuffer();
            response.getOutputStream().flush();
        }
    }
}
}
```

Finally, a Java implementation of the database interface for one implementation of the present invention is provided:

```
package com.maverick.atlee;
import java.util.ArrayList;
import java.util.Iterator;
import java.util.List;
import java.util.Map;
import org.ofbiz.base.util.Debug;
import org.ofbiz.base.util.UtilMisc;
import org.ofbiz.entity.GenericDelegator;
import org.ofbiz.entity.GenericValue;
import org.ofbiz.service.DispatchContext;
import org.ofbiz.service.ServiceUtil;
public class DictionaryServices {
    public static Map<String, Object> getAtleeKeywords(DispatchContext dctx,
Map<String, ? extends Object> context) {
        GenericDelegator delegator = (GenericDelegator) dctx.getDelegator( );
        String lang = (String) context.get("langId");
        List<String> keywords = new ArrayList<String>( );
        Map<String, Object> results = ServiceUtil.returnSuccess( );
        try {
            List<GenericValue> gvs = delegator.findByAndCache("TranslationValue",
UtilMisc.toMap("Lang", lang, "Variant", 0L));
            Iterator<GenericValue> gvi = gvs.iterator( );
            while (gvi.hasNext( )) {
                keywords.add(gvi.next( ).getString("BaseTerm"));
            }
        }
        catch ( Exception e ) {
            Debug.logError(e.getMessage( ),"Getting " + lang);
            results = ServiceUtil.returnError(e.getLocalizedMessage( ));
        }
        results.put("keywords",keywords);
            return results;
    }
    public static Map<String, Object> getAtleeTranslation(DispatchContext dctx,
Map<String, ? extends Object> context) {
        GenericDelegator delegator = (GenericDelegator) dctx.getDelegator( );
        String lang = (String) context.get("langId");
        String englishTerm = (String) context.get("term");
        Map<String, Object> results = ServiceUtil.returnSuccess( );
        try {
            List<GenericValue> gvs = delegator.findByAndCache("TranslationValue",
UtilMisc.toMap("Lang", lang.toLowerCase( ), "BaseTerm",
englishTerm.toLowerCase( )));
            results.put("definitions", gvs);
        }
        catch ( Exception e ) {
            Debug.logError(e.getMessage( ), "Getting " + lang);
            results = ServiceUtil.returnError(e.getLocalizedMessage( ));
        }
            return results;
    }
}
```

Figure 17:
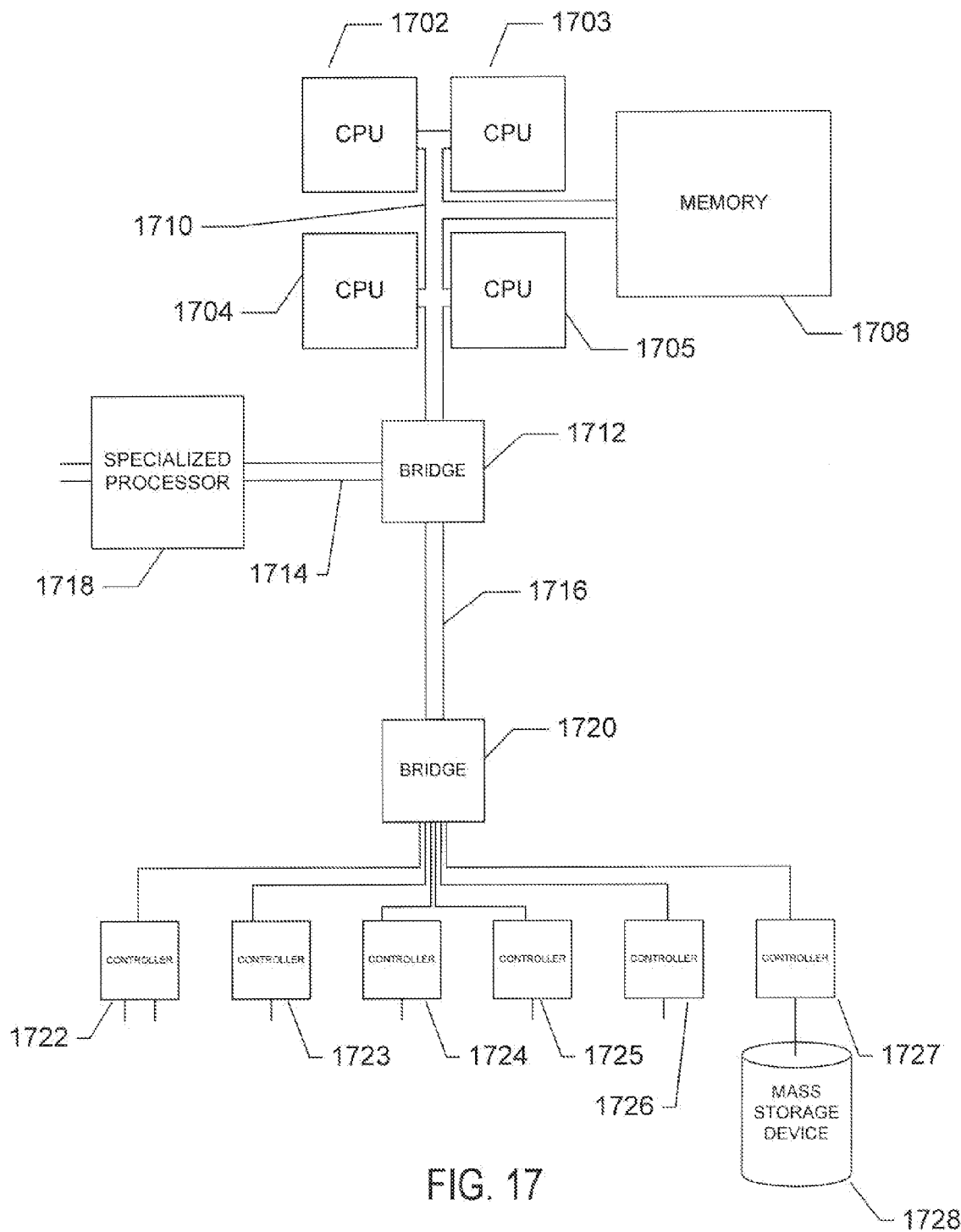
FIG. 17 illustrates a general-purpose computer architecture.

FIG. 17 illustrates a general-purpose computer architecture. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. Client-computer and web-server components of embodiments of a term-translation system that represents one embodiment of the present invention can be described by the illustrated general-purpose computer architecture. The computer system contains one or multiple central processing units ("CPUs") 1702-1705, one or more electronic memories 1708 interconnected with the CPUs by a CPU/memory-subsystem bus 1710 or multiple busses, a first bridge 1712 that interconnects the CPU/memory-subsystem bus 1710 with additional busses 1714 and 1716, or other types of high-speed interconnection media, including multiple, high-speed serial interconnects. These busses or serial interconnections, in turn, connect the CPUs and memory with specialized processors, such as a graphics processor 1718, and with one or more additional bridges 1720, which are interconnected with high-speed serial links or with multiple controllers 1722-1727, such as controller 1727, that provide access to various different types of mass-storage devices 1728, electronic displays, input devices, and other such components, subcomponents, and computational resources.

Although the present invention has been described in terms of particular embodiments, it is not intended that the invention be limited to these embodiments. Modifications within the spirit of the invention will be apparent to those skilled in the art. For example, both the browser enhancements and client-side scripts can be implemented in any number of different programming languages, using various different modular organizations, control structures, data structures, and with variations and other development parameters. Similarly, the server-side functionality, including the filter, can be implemented using any number of different programming languages, with the common development parameters, such as modular organization, control structures, and data structures, varied in different embodiments of the present invention. As discussed above, client-side functionality may be plug-ins and other executables downloaded by users, scripts that are transferred to callback functions to the client side and cached on the client side, or scripts or other executables included directly within term-translation-enhanced web pages. The parameters that may be specified by users on the client side to control term translation may include specifying the target language, specifying the base language for which term translations are desired, specifying particular term-translation databases for term translation, specifying whether or not translatable terms are to be highlighted or otherwise visually identified by the browser, and many other types of functionalities and options. A term-translation engine and/or databases may be contained within a client computer, within a web server, or may be maintained on computer systems remote to the client computers and web servers. In alternative embodiments, selective term translation is provided to users of various additional types of information display systems, including electronic-book displays, mobile phones, and other information-display devices. Information descriptions may include web-page descriptions or other types of electronically stored information-display specifications. While the embodiments described above included web servers that provide term-translation-enhanced web-page descriptions to browsers executing on client computers, term-translation-enhanced information descriptions of many different types may be provided, as a service, to both web servers and client computers by term-translation-enhanced-service computers.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A term-translation-enhanced information-rendering system comprising:
   a computer system, including one or more processors, electronic memory, communications-hardware interfaces, a display device, and an operating system;
   an information-rendering application program that runs on the computer system to render information descriptions for display to a user on the display device;
   a term-translation event handler invoked by the information-rendering application program, during rendering and display of term-translation-enhanced information descriptions, to display a translation for a particular, displayed term upon detection of user input requesting translation of the term; and
   a term-translation-settings management module that provides, to a user of the computer system, a user interface through which the user can select values for various term-translation settings that control term translation for information displayed by the information-rendering application program.

2. The term-translation-enhanced information-rendering system of claim 1 wherein the information descriptions comprise electronically stored and transmitted files that specify, to the information-rendering application program, textual, graphical, and/or other information for rendering and display to a user.

3. The term-translation-enhanced information-rendering system of claim 2 wherein the information descriptions include HTML descriptions of web pages for rendering and display.

4. The term-translation-enhanced information-rendering system of claim 1 wherein the information-rendering application program displays a visual indication, to the user, for each displayed term for which a translation can be displayed.

5. The term-translation-enhanced information-rendering system of claim 1 wherein the term-translation event handler is invoked by the information-rendering application program upon notification of an input event corresponding to user input to a displayed term and wherein the term-translation event handler obtains a translation for the displayed term associated with the input event and displays the translation to the user on the display device.

6. The term-translation-enhanced information-rendering system of claim 5 wherein the term-translation event handler obtains a translation for the displayed term associated with the input event by one of:
   requesting the translation from a local term-translation database;
   requesting the translation from a remote term-translation database;
   requesting the translation from a remote web server; and
   retrieving the translation from a local term-translation cache.

7. The term-translation-enhanced information-rendering system of claim 1 wherein the term-translation-settings management module provides the user, through the displayed user interface, with the ability to set the value of settings to:
   turn on term translation;
   turn off term translation; and
   specify a target language for term translation, in which translations are provided.

8. The term-translation-enhanced information-rendering system of claim 1 wherein a displayed term translation includes one or more target-language terms and wherein each target-language term is be associated with 0, 1, or more definitions in the target language.

9. The term-translation-enhanced information-rendering system of claim 8 wherein the target language is one of:
   a natural language different from a base language of the displayed information;
   a technical language; and
   a scientific language.

10. A term-translation-enhanced information-description-providing system comprising:
    a computer system, including one or more processors, electronic memory, communications-hardware interfaces, a display device, and an operating system;
    an information-providing application program that runs on the computer system to receive a request for a term-translation-enhanced information description from an information-rendering application program and transmit to the information-rendering application program a term-translation-enhanced information description in response to the request; and
    a term-translation filter invoked by the information-providing application program to electronically mark translatable terms within a partially-term-translation-enabled information description to produce a corresponding term-translation-enabled information description.

11. The term-translation-enhanced information-description-providing system of claim 10 wherein the information descriptions comprise electronically stored and transmitted files that specify, to the information-rendering application program, textual, graphical, and/or other information for rendering and display to a user.

12. The term-translation-enhanced information-description-providing system of claim 11 wherein the information descriptions include HTML descriptions of web pages for rendering and display.

13. The term-translation-enhanced information-description-providing system of claim 10 wherein the information-providing application program receives a request for a term-translation-enhanced information description from an information-rendering application program and transmits to the information-rendering application program a term-translation-enhanced information description in response to the request by:
  receiving the request through a communications interface;
  locating an electronically-stored partially-term-translation-enabled information description corresponding to the requested term-translation-enhanced information description;
  invoking the term-translation filter to electronically mark translatable terms within the partially-term-translation-enabled information description to produce a corresponding term-translation-enabled information description; and
  transmitting the term-translation-enhanced information description to the information-rendering application program.

14. The term-translation-enhanced information-description-providing system of claim 13 wherein the partially-term-translation-enabled information description comprises an information description in which one or more particular portions of text specified for display to a user are marked as term-translation regions to enable term translation for certain terms within the term-translation regions.

15. The term-translation-enhanced information-description-providing system of claim 14 wherein the term-translation filter:
  identifies the term-translation regions within a partially-term-translation-enabled information description; and
  for each term within each identified term-translation region,
    determines whether a target-language translation is available for the term, and
    when a target-language translation is available for the term, electronically marks the term as a translatable term.

16. The term-translation-enhanced information-description-providing system of claim 15 wherein the term-translation filter determines whether a target-language translation is available for the term by comparing the term to a list of terms for which translations are available to the target language obtained from a translation database.

17. The term-translation-enhanced information-description-providing system of claim 14 wherein the partially-term-translation-enabled information description further comprises scripts or a callback to obtain scripts, execution of which is invoked by the information-rendering application program to implement a term-translation event handler to display a translation for a particular term upon detection of user input requesting translation of the term.

18. The term-translation-enhanced information-description-providing system of claim 17 wherein the term-translation-enhanced information-description-providing system additionally receives requests from the term-translation event handler to provide translations for particular terms and responds to the requests by returning one or more target-language translation obtained from a term-translation database.

19. The term-translation-enhanced information-description-providing system of claim 10 wherein term-translation-enhanced information-description-providing system obtains lists of terms for which target-language translations are available and one or more translations for a particular term by one of:
  requesting the list of terms or the target-language translation from a local term-translation database;
  requesting the list of terms or the target-language translation from a remote term-translation database;
  retrieving the target-language translation from a local term-translation cache.

20. The term-translation-enhanced information-description-providing system of claim 10 wherein a displayed term translation includes one or more target-language terms and wherein each target-language term is be associated with 0, 1, or more definitions in the target language.

* * * * *